United States Patent
Chandran

(10) Patent No.: US 7,890,083 B2
(45) Date of Patent: Feb. 15, 2011

(54) METHOD OF TRACKING STOLEN MOBILE DEVICE CONNECTED TO WIRELESS OR WIRED NETWORK

(75) Inventor: Sujith Chandran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 813 days.

(21) Appl. No.: 11/293,223

(22) Filed: Dec. 5, 2005
(Under 37 CFR 1.47)

(65) Prior Publication Data
US 2006/0276175 A1    Dec. 7, 2006

(30) Foreign Application Priority Data
Dec. 3, 2004    (IN) ................. 1307/CHE/2004

(51) Int. Cl.
*H04M 1/66*    (2006.01)
(52) U.S. Cl. .................. 455/411; 455/410; 455/557; 340/426.2
(58) Field of Classification Search ............... 455/410, 455/411, 457
See application file for complete search history.

(56) References Cited

U.S. PATENT DOCUMENTS 6,662,023 B1 * 12/2003 Helle ................ 455/558
2006/0041380 A1 * 2/2006 Motoyama et al. ........ 701/213
2006/0089120 A1 * 4/2006 Luo et al. ................ 455/410

FOREIGN PATENT DOCUMENTS

| EP | 1596622 | * 11/2005 |
|----|---------|-----------|
| KR | 10-2005-0028152 A | 3/2005 |
| KR | 10-2005-0073019 A | 7/2005 |
| WO | WO02069657 A1 * | 9/2002 |

OTHER PUBLICATIONS

Translation of WO 2002069657 A1.*

* cited by examiner

*Primary Examiner*—Lester Kincaid
*Assistant Examiner*—Mehmood B Khan
(74) *Attorney, Agent, or Firm*—Sughrue Mion, PLLC

(57) ABSTRACT

A method of tracking a lost mobile electronic device connected to a wireless or wired network is provided. The method includes: storing user identity information included in a user identity card inserted into the mobile device, a warning message, and information regarding a destination of the warning message; and when a new user identity card is inserted into the mobile device, comparing user identity information stored in the new user identity card with the stored user identity information and automatically transmitting the warning message to the destination of the warning message if the user identity information stored in the new user identity card is not identical to the stored user identity information. Accordingly, it is possible to easily track a lost mobile electronic device connected to a wireless or wired network.

15 Claims, 2 Drawing Sheets

METHOD OF TRACKING STOLEN MOBILE DEVICE CONNECTED TO WIRELESS OR WIRED NETWORK

CROSS-REFERENCE TO RELATED PATENT APPLICATIONS

This application claims the benefit of Indian Patent Application No. 1307/CHE/2004, filed on Dec. 3, 2004, in the Indian Intellectual Property Office, the disclosure of which is incorporated herein in its entirety by reference.

BACKGROUND OF THE INVENTION

1. Field of the Invention

The present invention relates to methods of securing a mobile phone, tracking a stolen mobile phone, securing electronic devices connected to a network, and tracking stolen electronic devices connected to the network, and more particularly, to a method of tracking stolen mobile electronic devices, laptops, or mobile phones which are connected to a wireless or wired network.

2. Description of the Related Art

FIG. 1 is a schematic diagram of a mobile network performing a conventional identity check procedure. Referring to FIG. 1, a serving GPRS support node (SGSN) or a mobile services switching center (MSSC) transmits an identity request to a mobile station (MS). In response, the MS transmits an identity response to the SGSN or the MSSC. If the SGSN or the MSC decides to check an international mobile equipment identity (IMEI) against an equipment identity register (EIR), the SGSN or the MSC transmits a check IMEI to the EIR. The EIR responds with a check IMEI Ack to the SGSN or the MSC.

The conventional mobile network attempts the following method to track a stolen mobile device.

A stolen mobile device owner manually reports to an operator that his/her mobile device was stolen. The mobile network requests all mobile devices connected thereto for the IMEI. The mobile network compares IMEIs received from all mobile devices with those stored in the EIR. As a result, if the mobile network checks the IMEI of the stolen mobile device, the operator can take an appropriate action for the stolen mobile device that transmits its IMEI.

The conventional method of tracking stolen mobile devices is used to find out who uses the stolen mobile devices.

Since the stolen mobile devices are generally used after their SIM/USIM cards are changed, the conventional method of tracking stolen mobile devices are helpful in finding out who are using stolen mobile devices only if the following two requirements are satisfied.

First, mobile device owners must provide IMEIs of stolen mobile devices to an operator. Also, a network must store international mobile subscriber identities (IMSI) of actual owners in database. This is the case where the network transmits an identity request to the MS to obtain IMEIs before it is reported that mobile devices are stolen to the operator. It is optional that the network transmits the identity request to the MS.

Second, stolen mobile devices must be used in one operator's mobile network. If stolen mobile devices are used in another operator's mobile network, the conventional method cannot track stolen mobile devices.

However, the conventional method has some limitations as indicated below.

First, if mobile devices are stolen, stolen mobile device users must manually report to the operator that mobile devices are stolen to track stolen mobile devices. This report does not guarantee any positive results whether to track stolen mobile devices.

Second, if stolen mobile devices are used with another operator's SIM in a different network, it is useless that stolen mobile device users report to the operator in a home network that mobile devices are stolen. In this case, stolen mobile device users have to report to the operator in the different network where the stolen mobile devices are used. However, it is very difficult to do so.

Third, the network requests IMEIs of all mobile devices connected thereto.

Fourth, it is optional that networks store IMEIs in EIRs. Some networks may not store IMEIs. Also, if stolen mobile device users do not note down IMEIs, stolen mobile devices cannot be tracked.

Fifth, a method of preventing mobile devices from being stolen such as personalization does not helpful in tracking stolen mobile devices. Personalization means that networks, service providers, SIM/USIM, etc., are personalized in order to restrict SIM/USIMs of mobile devices.

SUMMARY OF THE INVENTION

The present invention provides a method of tracking a stolen mobile device by making the stolen mobile device detect an available misuse and report the misuse to a stolen mobile device owner without an identity request of a network. The misuse occurs where a mobile phone is stolen and its SIM/USIM is replaced, or a stolen mobile device other than the mobile phone is connected to the network.

The present invention also provides a method of sending a warning—short message service (SMS) that is not affected by an outgoing call/SMS barring setting.

The present invention provides a method of tracking a lost mobile phone, a lost mobile laptop computer, or another lost mobile electronic device connected to a wireless or wired network.

The present invention also provides a method of notifying the owner of a lost mobile device of user identity information and current location information of a current user of the mobile device via a warning message transmitted via a SMS or email.

The present invention also provides a method of requesting user information of a user and storing the user information in a memory.

The present invention also provides a method of delaying the transmission of an SMS message or email until an outgoing call/SMS barring option is cancelled if the outgoing call/SMS barring option is set in a mobile device.

According to an aspect of the present invention, there is provided a method of tracking a lost mobile device connected to a wireless or wired network. The method includes: storing user identity information included in a user identity card inserted into the mobile device, a warning message, and information regarding a destination of the warning message; and when a new user identity card is inserted into the mobile device, comparing user identity information stored in the new user identity card with the stored user identity information and automatically transmitting the warning message to the destination of the warning message if the user identity information stored in the new user identity card is not identical to the stored user identity information.

The automatic transmission of the warning message may be secretly performed so that the new user of the mobile device can not perceive the transmission.

The user identity card may be a subscriber identity module (SIM) card.

The warning message may include text information.

The user identity information included in the user identity card, the warning message, and the information regarding a destination of the warning message may be stored and modified by inputting password.

The warning message may be transmitted via a short message service (SMS) or email.

The warning message may include user identity information included in a current user's identity card and information specifying a current location of the mobile device as well as text information.

The user identity information included in a current user's identity card may include one of MSISDN(Mobile Station International Subscriber Directory Number) or IMSI(International Mobile Station Identity).

The subscriber is given two numbers in WCDMA IMT-2000. one is IMSI given to USIM card and the other one is MSISDN given to the mobile device.

MSISDN is the telephone number in the GSM network. MSISDN includes Country Code, Network Code and Directory Number.

IMSI is a number of 15 figures allotted to mobile phones. IMSI is allotted uniquely and used for international roaming services. IMSI includes Mobile Country Code, Mobile Network Code, Subscriber Identity number and International Mobile Subscriber Identity number.

The user identity information included in the user identity card inserted into the mobile device, the warning message, and the information regarding the destination of the warning message may be stored in a non-volatile random access memory (NVRAM).

The information regarding the destination of the warning message may include one of an email address and a phone number of the destination of the warning message.

The method may also include, if the mobile device is a mobile device equipped with an SIM/USIM card, storing IMSI information of the SIM/USIM card in the memory (203).

The method may also include, if the transmission of the warning message fails, retransmitting the warning message at regular intervals until the warning message is successfully transmitted to the destination of the warning message.

The method may also include, if an outgoing call/SMS barring option is set in the mobile device, transmitting the warning message to the destination of the warning message after the outgoing call/SMS barring option is canceled.

In case an emergency call/SMS is allowed, even when an outgoing call/SMS barring option is set, a warning SMS/e-mail can be transmitted by using the emergency call/SMS.

According to another aspect of the present invention, there is provided a mobile device connected to a wireless or wireless network. The mobile device includes: a tracking control module which controls a lost mobile device for tracking the lost mobile device; a memory (203) which stores a warning message, information regarding a destination of the warning message, and user identity information; a display module which displays the state of the mobile device; a SIM/USIM interface module into which a user identity card is inserted; a network access module which connects the mobile device to a network in a wireless or wired manner; and a processor which controls the mobile device.

The tracking control module may include: a tracking control key (TCK) authentication module which sets the tracking control module to be in an active/inactive state; a customization module (303) which maintains the format and content of the warning message; a SIM/USIM information access module which obtains user identity information and information regarding whether the mobile device is prevented from making calls from the user identity card, detects the change of the user identity card, and transmits the warning message to the destination of the warning message if the change detected; a location information access module (307) which obtains information specifying a current location of the mobile device; a call barring status check module (309) which checks whether the call barring status is changed; and an information display module (311) which displays a current state of the mobile device.

The tracking control module may include: a tracking control key (TCK) authentication module which sets the tracking control module to be in an active/inactive state; a customization module (303) which maintains the format and content of the warning message; a network access check module (313) which checks whether the mobile device is connected to the network and transmits the warning message to the destination of the warning message when the mobile device is connected to the network; a location information access module (307) which obtains information specifying a current location of the mobile device; a call barring status check module (309) which checks whether the call barring status is changed; and an information display module (311) which displays a current state of the mobile device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
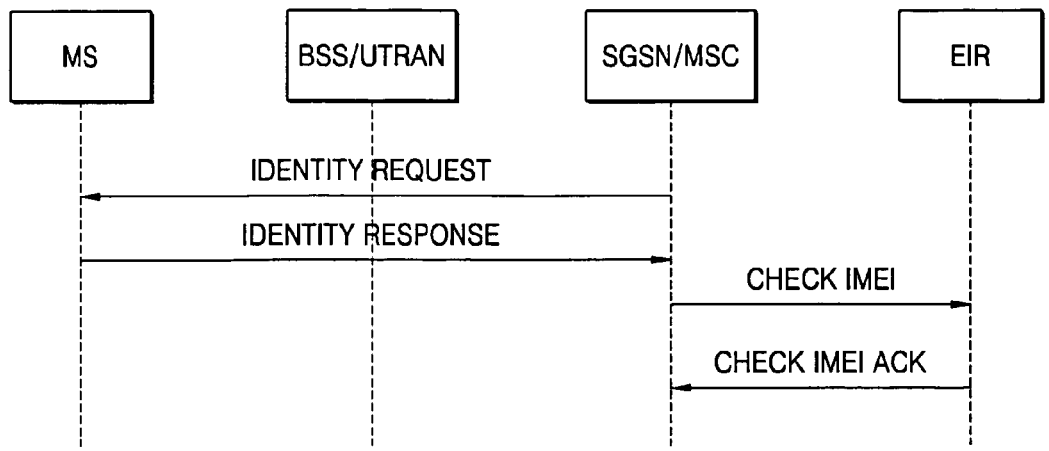
FIG. 1 is a schematic diagram of a mobile network performing a conventional identity check procedure.
Figure 2:
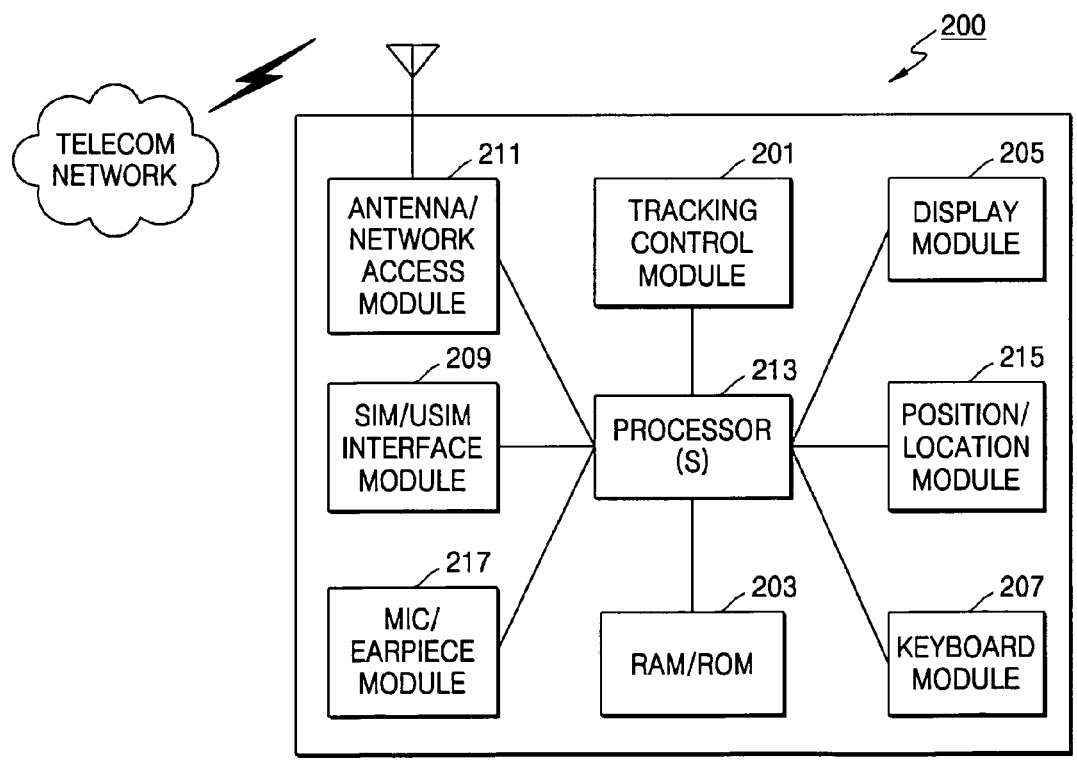
FIG. 2 is a block diagram of a mobile electronic device used in a remote telecom network according to an embodiment of the present invention.

FIG. 2 is a block diagram of a mobile electronic device used in a remote telecom network according to an embodiment of the present invention. Referring to FIG. 2, the mobile electronic device includes a tracking control module 201, a memory 203 which is a random access memory (RAM) or a read-only memory (ROM), a display module 205, a keyboard module 207, a user identity interface module 209 which is a SIM/USIM interface module, a network access module (antenna) 211, a microprocessor 213, a location module 215, and a microphone/earpiece module 217.

The tracking control module 201 controls a lost mobile device for tracking the lost mobile device. The memory 203 stores warning messages, information regarding destinations of the warning messages, and user identity information. The display module 205 displays the state of the mobile electronic device. The keyboard module 207 operates a keypad to control various functions of the mobile electronic device. The user identity interface module 209 enables a user identity card to be inserted into and thus connected to the mobile electronic device. The network access module 211 wiredly or wirelessly connects the mobile electronic device to the telecom network. The microprocessor 213 controls the functions of the mobile electronic device. The location module 215 identifies the location of the mobile electronic device and provides information regarding the identified location of the mobile electronic device to the tracking control module 201.

Figure 3:
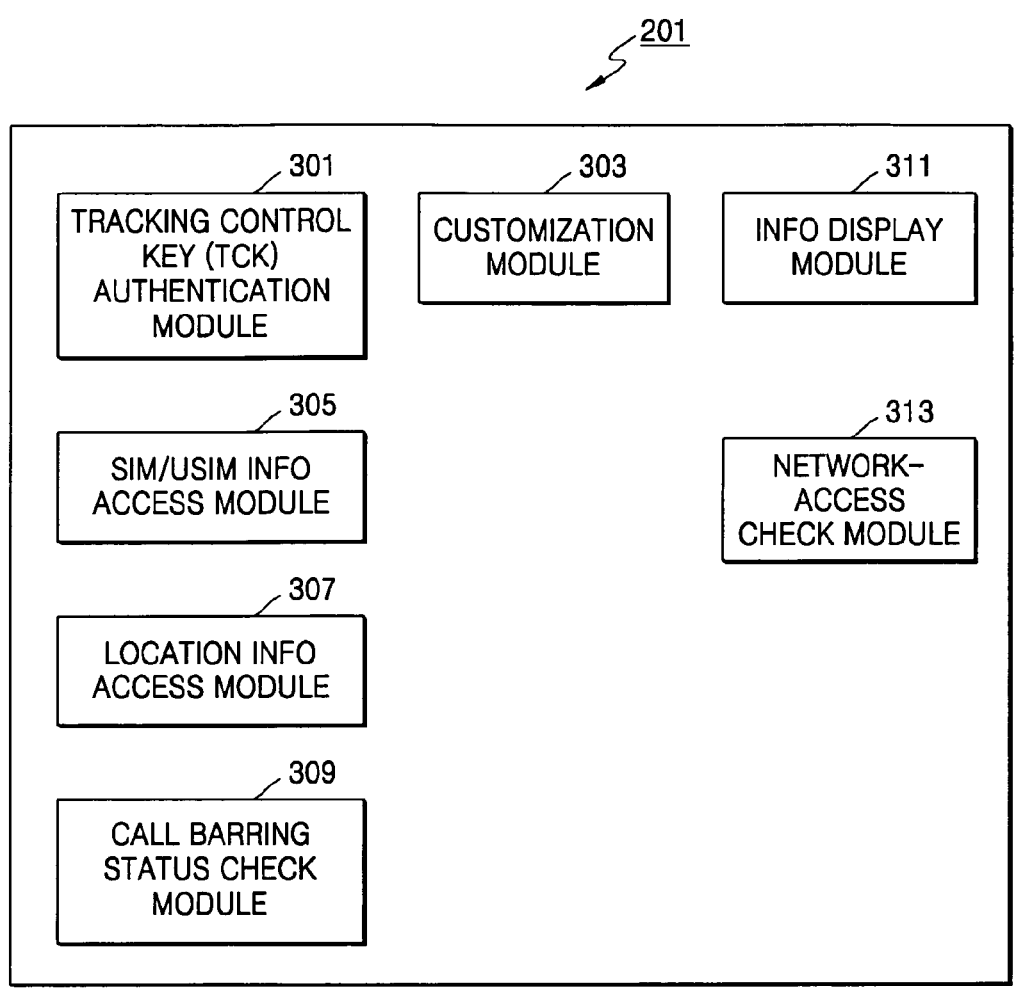
FIG. 3 is a block diagram of a tracking control module included in the mobile electronic device of FIG. 2.

A major focus of the present invention is on the operation of the tracking control module 201. FIG. 3 is a block diagram of the tracking control module 201 included in the mobile electronic device of FIG. 2. Major operating features of the tracking control module 201 are as follows.

When the mobile electronic device is turned on after an SIM/USIM card which is different from the original SIM/USIM is inserted thereinto, the tracking control module 201 controls the mobile electronic device to automatically send a warning SMS/e-mail to a predetermined destination.

The mobile electronic device offers a number of menu options which must be protected using tracking control keys (TCKs). In detail, the mobile electronic device offers a menu option for turning on or off the tracking control module 201, a menu option for editing an e-mail address and telephone number of a destination, a menu option for editing the content of a warning SMS/e-mail to be sent.

The tracking control module 201 performs the following tracking control operations. When a user inputs a TCK, i.e., a user password, the tracking control module 201 is activated. The user inputs the destination of a warning SMS/e-mail and may also input the content of a warning SMS/e-mail. Once such information is input, the tracking control module 201 is activated. When the user desires to access or edit the information later, the user must input the TCK.

The warning SMS/e-mail may include information regarding the current location of the user and MSISDN/IMSI in addition to a text input by the user. User identity information, an e-mail address/telephone number of a destination, and a text to be transmitted are stored in the memory 203, i.e., a non-volatile random access memory (NVRAM).

As described above, when the tracking control module 201 is activated, an IMSI of an SIM/USIM card is stored in the memory 203 of the mobile electronic device into which the SIM/USIM card is inserted. If a user has not inserted an SIM/USIM card into the mobile electronic device, the user is instructed to do so.

As described above, if the tracking control module 201 is activated, whenever a new SIM card is inserted into the mobile electronic device, the IMSI of the inserted SIM card is compared with a corresponding IMSI stored in the mobile electronic device. When the IMSI of the inserted SIM card is not identical to the IMSI stored in the mobile electronic device, the owner of the mobile electronic device sends a warning SMS/e-mail to a predetermined destination. Information regarding the current location of the mobile electronic device may also be included in the warning SMS/e-mail.

If the mobile electronic device is turned on and successfully connected to the network without having an SIM/USIM card inserted into the mobile electronic device, the mobile electronic device may send a warning SMS/e-mail to a predetermined destination.

If the mobile electronic device fails to send the warning SMS/e-mail, the mobile device keeps trying to send the warning SMS/e-mail at regular intervals until it successfully sends the warning SMS/e-mail. Meanwhile, the regular intervals may be set by a user.

If an outgoing call/SMS barring option is set in a mobile electronic device, the mobile electronic device remembers the change of the SIM/USIM card and sends a warning SMS/e-mail to a predetermined destination after the outgoing call/SMS barring option is removed.

The mobile electronic device can send a warning SMS/e-mail whenever an SIM card is inserted. If the outgoing call/SMS barring option is set, the mobile electronic device is generally not allowed to send a warning SMS/e-mail. However, according to the present invention, the mobile electronic device can send a warning SMS/e-mail even when the outgoing call/SMS barring option is set. To send a warning SMS/e-mail even when the outgoing call/SMS barring option is set, the network must be set accordingly. In other words, the network must be set in a way that allows an emergency SMS to be sent, like an emergency call is allowed to make.

For such operations described above, the tracking control module 201 includes a TCK authentication module 301, a customisation module 303, an SIM/USIM information access module 305, a location information access module 307, a call barring status check module 309, an information display module 311, and a network access check module 313.

The TCK authentication module 301 activates or deactivates the tracking control module 201. The customisation module 303 maintains the format and content of a warning SMS/e-mail.

The SIM/USIM information access module 305 obtains user identity information (IMSI) and information regarding whether the mobile device is prevented from making calls from the user identity card, detects the change of the user identity card, and transmits the warning message to the destination of the warning message if the change detected.

The location information access module 307 obtains information regarding the current location of the mobile electronic device when a user selects an option for including the information in a warning SMS/e-mail.

When an outgoing call/SMS barring option is set, the call barring status check module 309 checks changes in the call barring status at regular intervals. When the outgoing call/SMS barring option is released, the mobile electronic device sends the warning SMS/e-mail.

The information display module 311 displays a current setting. The network access check module 313 is for mobile electronic devices which do not use SIM card. The network access check module 313 checks whether the mobile electronic device is connected to the network and sends a warning SMS/e-mail to a predetermined destination if the mobile electronic device is connected to the network.

According to the present invention, when mobile phones, laptops, or other mobile electronic devices which access a wired or wireless network are lost, they can be easily tracked.

In addition, according to the present invention, an owner of a mobile device can be informed of user identity information and location information of the mobile device through a warning SMS/e-mail.

Further, according to the present invention, it is possible to request a user for user identity information and store the user identity information in a memory. Last, according to the present invention, even when an outgoing call/SMS barring option is set, the transmission of a warning SMS/e-mail can be delayed until the outgoing call/SMS barring option is cancelled.

The present invention has the following advantages according to embodiments of the present invention.

First, a stolen mobile can be tracked without an identity request of a network.

Second, a stolen mobile device owner can track the location of the stolen mobile device without user's or operator's extra efforts required to track the stolen mobile device.

Third, a method of efficiently and quickly tracking the stolen mobile device is provided compared to the network that requests IMEIs of all users which does not guarantee any accurate results.

Fourth, it does not depend on the presence of EIR in the network.

Fifth, the stolen mobile device is not prevented from being used. The stolen mobile device can be used by a different SIM/USIM card, thereby making it easier to track the stolen mobile device.

Sixth, when the stolen mobile device is activated and its SIM/USIM card is changed, the stolen mobile device does not display any information to a new user but displays owner's contact information. The displaying owner's contact information is more useful, since the owner can be reached if the new user had not intended to steal the mobile device, than a conventional method of checking a personal identification number (PIN) and blocking calls.

Seventh, when the mobile device is connected to the network after being powered on, an email is transmitted to a predetermined address, which is used to track a mobile device (a laptop or PDA).

When a mobile device is powered on after a SIM/USIM card is changed or a different SIM/USIM card from an owner's SIM/USIM card is inserted, or a mobile device or a laptop is connected to a network after being powered on, the mobile device or the laptop sends a SMS/email to a predetermined destination address, thereby tracking a stolen mobile phone, laptop, or other mobile electronic devices.

The stolen mobile device can be tracked by not adding an extra function to a network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of tracking a lost mobile device connected to a wireless or wired network comprising:
   storing user identity information included in a user identity card inserted into the mobile device, a warning message, and information regarding a destination of the warning message; and when a new user identity card is inserted into the mobile device, comparing user identity information stored in the new user identity card with the stored user identity information and automatically transmitting the warning message to the destination of the warning message if the user identity information stored in the new user identity card is not identical to the stored user identity information,
   wherein if an outgoing call/SMS barring option is set in the mobile device,
   checking changes in a status of the outgoing call/SMS barring option at regular intervals, and
   transmitting the warning message to the destination of the warning message when detecting the status of the outgoing call/SMS barring option as canceled,
   wherein after inputting a password, the warning message, and the destination of the warning message, a tracking module which performs tracking of the lost mobile device, is activated, and
   wherein the password is required when accessing or editing the password, when accessing or editing contents of the warning message, and when accessing or editing the destination of the warning message,
   wherein the contents of the warning message includes current location of the user, Mobile Station International Subscriber Directory Number (MSISDN)/International Mobile Subscriber Identities (IMSI), and text input by said user.

2. The method of claim 1, wherein the automatic transmission of the warning message is secretly performed so that the new user of the mobile device can not perceive the transmission.

3. The method of claim 1, wherein the user identity card is a subscriber identity module (SIM) card.

4. The method of claim 1, wherein the user identity information included in the user identity card, the warning message, and the information regarding the destination of the warning message are stored and modified by inputting the password.

5. The method of claim 1, wherein the warning message is transmitted via a short message service (SMS) or email.

6. The method of claim 1, wherein the warning message comprises user identity information included in the new user's identity card and information specifying a current location of the mobile device as well as text information.

7. The method of claim 6, wherein the user identity information included in the new user's identity card comprises one of MSISDN or IMSI.

8. The method of claim 1, wherein the user identity information included in the user identity card inserted into the mobile device, the warning message, and the information regarding the destination of the warning message are stored in a non-volatile random access memory (NVRAM).

9. The method of claim 1, wherein the information regarding the destination of the warning message comprises one of an email address and a phone number of the destination of the warning message.

10. The method of claim 1 further comprising, if the mobile device is a mobile device equipped with an SIM/USIM card, storing IMSI information of the SIM/USIM card in the memory (203).

11. The method of claim 1 further comprising, if the transmission of the warning message fails, retransmitting the warning message at regular intervals until the warning message is successfully transmitted to the destination of the warning message.

12. The method of claim 1, even when an outgoing call/SMS barring option is set, the warning message is transmitted by using the emergency call/SMS.

13. A mobile device connected to a wireless or wired network comprising:
   a tracking control module which controls a lost mobile device for tracking the lost mobile device;
   a memory which stores a warning message, information regarding a destination of the warning message, and user identity information;
   a display module which displays the state of the mobile device;
   a SIM/USIM interface module into which a user identity card is inserted;
   a network access module which connects the mobile device to a network in a wireless or wired manner;
   when a new user identity card is inserted into the mobile device, comparing user identity information stored in the new user identity card with the stored user identity information and automatically transmitting the warning message to the destination of the warning message if the user identity information stored in the new user identity card is not identical to the stored user identity information; and a processor which controls the mobile device, wherein the tracking control module is activated, after a user inputs a user password, and the user inputs content of the warning message and the destination of the warning message that are stored in the memory, wherein the user password is required when accessing or editing the password, when accessing or editing the content of the warning message, and when accessing or editing the destination of the warning message, wherein if an outgoing call/SMS barring option is set in the mobile device, checking changes in a status of the outgoing call/SMS barring option at regular intervals, and transmitting the warning message to the destination of the warning message when detecting the status of the outgoing call/SMS barring option as canceled, wherein the content of the warning message includes current location of the user, Mobile Station International Subscriber Directory Number/International Mobile Subscriber Identities (MSISDN/IMSI), and text input by said user.

14. The mobile device of claim 13, wherein the tracking control module comprises:

a tracking control key authentication module which sets the tracking control module to be in an active/inactive state;

a customization module which maintains the format and content of the warning message;

a SIM/USIM information access module which obtains user identity information and information regarding whether the mobile device is prevented from making calls from the user identity card, detects the change of the user identity card, and transmits the warning message to the destination of the warning message if the change detected;

a location information access module which obtains information specifying a current location of the mobile device;

a call barring status check module which checks whether the call barring status is changed; and an information display module which displays a current state of the mobile device.

15. The mobile device of claim 13, wherein the tracking control module comprises:

a tracking control key authentication module which sets the tracking control module to be in an active/inactive state;

a customization module which maintains the format and content of the warning message;

a network access check module which checks whether the mobile device is connected to the network and transmits the warning message to the destination of the warning message when the mobile device is connected to the network;

a location information access module which obtains information specifying a current location of the mobile device;

a call barring status check module which checks whether the call barring status is changed; and an information display module which displays a current state of the mobile device.

* * * * *